March 19, 1935.  F. J. KREUTZER  1,994,654
METHOD AND APPARATUS FOR THE STORAGE OF HAY
Filed Oct. 17, 1932   3 Sheets-Sheet 3
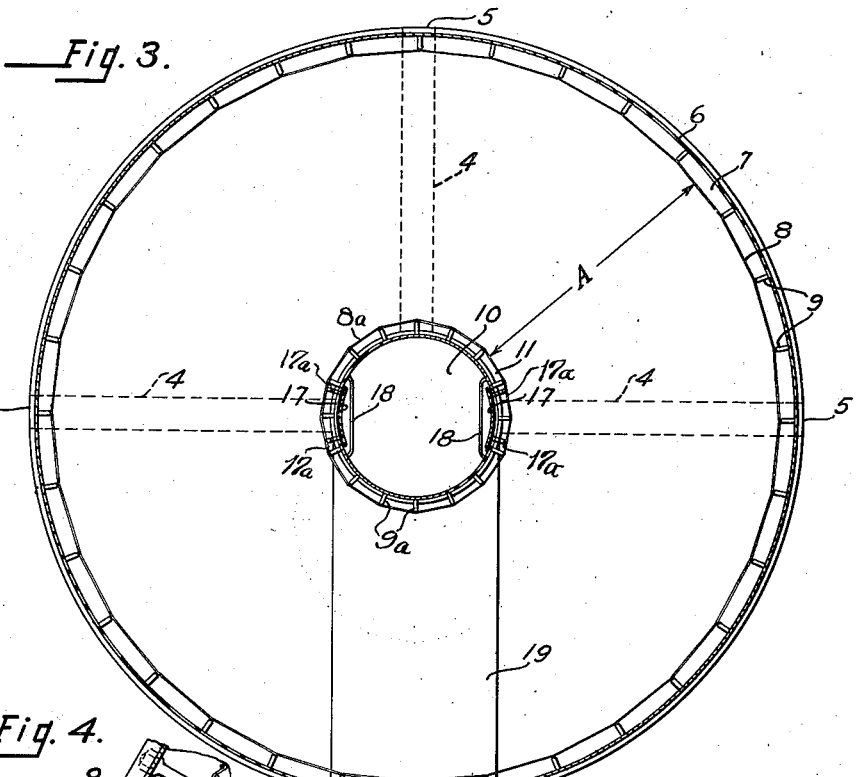
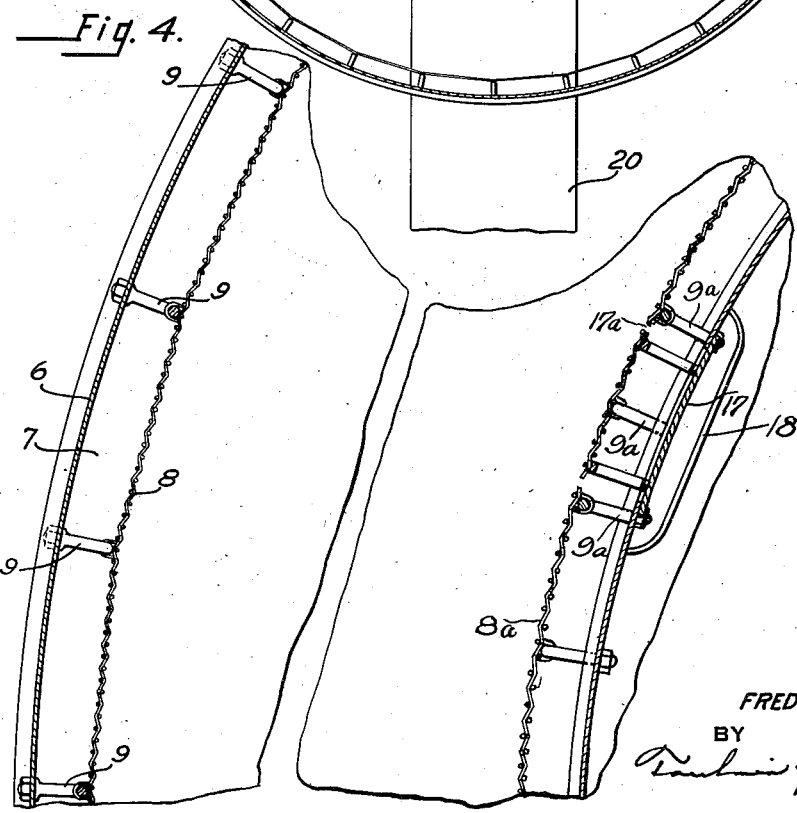
INVENTOR
FREDERIC J. KREUTZER.
BY
ATTORNEYS Patented Mar. 19, 1935

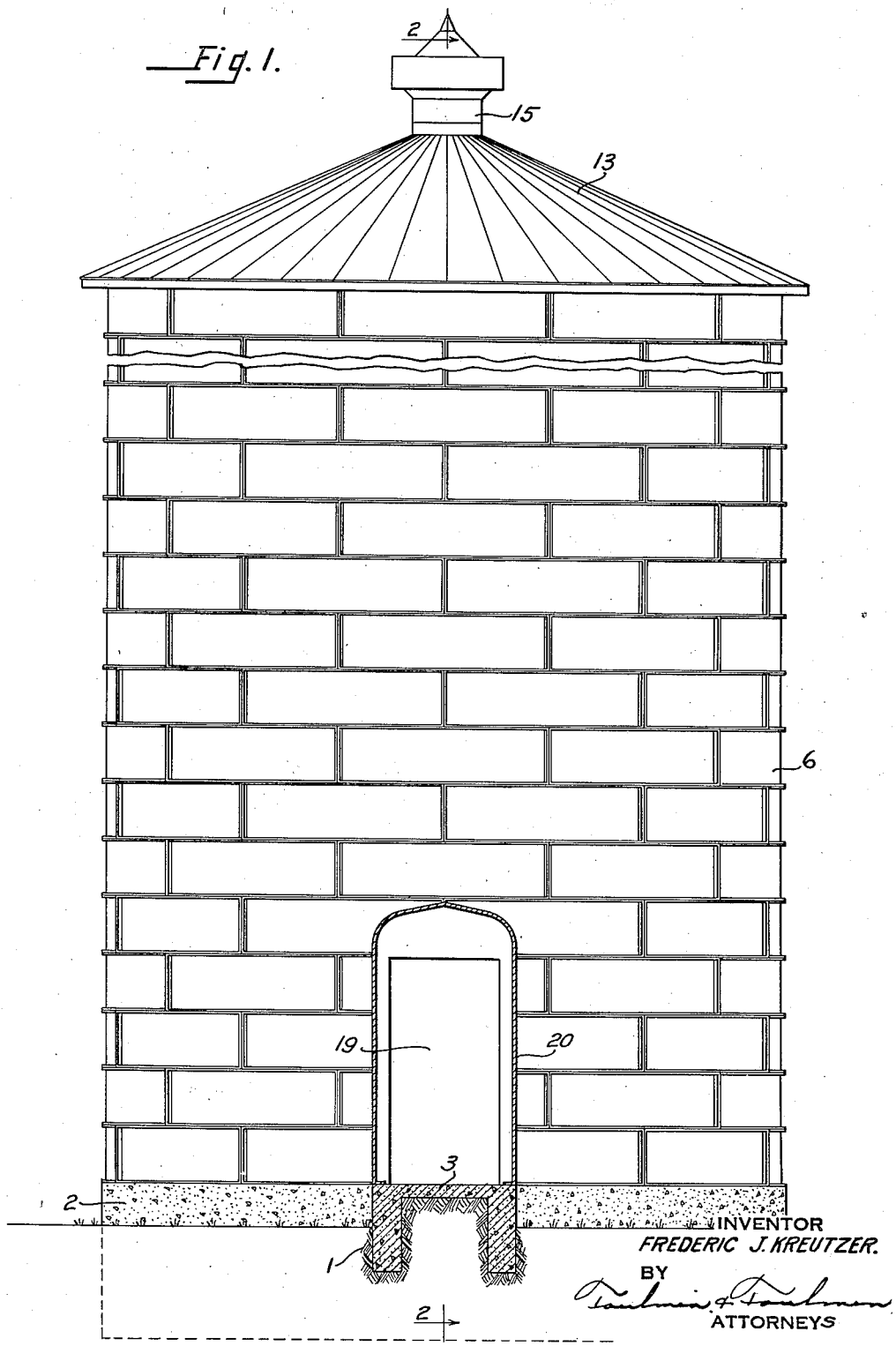

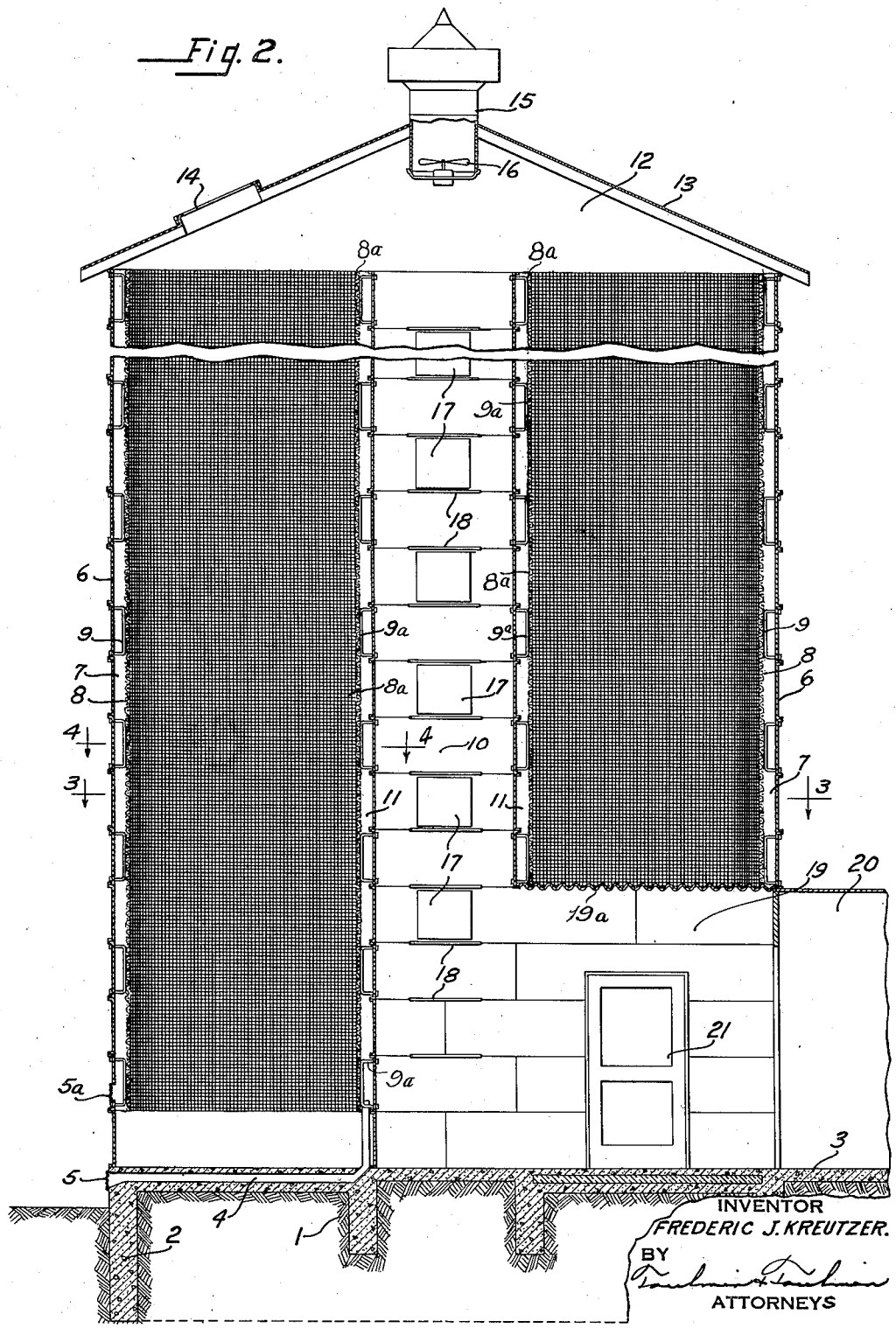

1,994,654

UNITED STATES PATENT OFFICE 1,994,654

METHOD AND APPARATUS FOR THE STORAGE OF HAY

Frederic J. Kreutzer, Elmira, N. Y., assignor to James Manufacturing Company, Fort Atkinson, Wis., a corporation of Wisconsin Application October 17, 1932, Serial No. 638,080

5 Claims. (Cl. 98—54)

My invention relates to a method and apparatus for the storage of hay.

It is the object of my invention to provide a means for the storage and disbursement of hay so as to maintain the hay in such a condition that it will not catch fire due to spontaneous combustion and so that any gases which may be generated in the hay will be rapidly carried away.

It is a further object to provide a container for the hay of such character that it is a conductor of electricity to prevent the gases in the hay being ignited by static electricity or by lightning.

It is a further object to provide a hay container which will act as a lightning conductor in order to protect adjacent buildings.

It is a particular object of my invention to provide a structure comprised of unitary sections so that any height of hay container may be employed; and a construction which may be quickly erected without the aid of skilled labor, it being possible to fabricate the entire construction at a factory, transport it to the farm in sections and erect it at the farm with ordinary labor.

In particular, it is my object to provide a forced draft evacuation of the gases generated in the hay and a forced draft method of circulating fresh air through the hay for curing purposes.

In practicing the method of my invention, the hay is cut, and, after a brief preliminary drying period in the field or after predrying mechanically, the hay is chopped in more or less green condition and delivered by a blower through the roof. The chopped hay which still has a considerable moisture content can be thus safely stored in my container because it is continuously ventilated according to my method without danger of moulding, spoiling or heating resulting in spontaneous combustion. While the hay can be stored without chopping, yet I prefer to do so as a greater content can be secured within a given size container and the hay is easier to handle and feed in that condition. It also facilitates the even ventilation of the entire mass.

Referring to the drawings:

Figure 1 is a side elevation of the hay storage chamber;

Figure 2 is a section on the line 2—2 of Figure 1;

Figure 3 is a section on the line 3—3 of Figure 2, with the ceiling 19a omitted in order to show passageway 19;

Figure 4 is an enlarged section showing the arrangement of the wire mesh, the outer and inner walls and the supports for the wire mesh on the line 4—4 of Figure 2.

Referring to the drawings in detail, 1 indicates the ground or other support for a foundation 2 having a floor 3. This floor is provided with ventilation passageways 4 having louvers 5 at the inlet ends to the ventilation passageways or vent ducts 4. Mounted upon this foundation 3 is an exterior wall of the container designated 6 composed of a plurality of sections which may be bolted or welded together to form the exterior wall of the hay container. If desired, this construction may be made of one piece of steel, but it is more practical to make it of a plurality of segmental sections of uniform height which may be shipped in knocked-down condition and bolted or welded together on the farm.

I prefer to use copper bearing galvanized sheet steel because of its long wearing qualities and because it is a conductor of electricity, thereby providing a suitable protection to the contents of the container against lightning and also serving as a protection against the effects of lightning on adjacent buildings.

Mounted within this container in spaced relationship thereto to provide an exterior air passageway 7 is a quarter inch mesh zinc-clad woven wire mesh 8 which is mounted upon the spacers 9. These spacers are located on alternate transverse courses or sections out of which the exterior of the container is built. The exact size of the mesh depends upon the character of the hay or other material being stored within the container.

Within this container is erected a relatively narrow chute 10 likewise composed of segmental metal sections which may be bolted or welded together. This metal chute is centrally located of the exterior wall 6 and carries on the exterior a similar series of spaced spacers 9a supporting an annular covering of wire mesh 8a. Such a covering being spaced from the chute 10 forms an air passageway 11 which is in communication with the bottom air inlet opening 5 and the passageway 4.

Referring to Fig. 4 the doors 17 are adapted to close apertures in the chute 10. There are a plurality of spacers 9a some of which are bolted to the walls of the chute. Other spacers 9a are attached to the doors 17. The woven wire mesh 8a is attached to the spacers so as to leave a passageway for the movement of air between the imperforate walls of the chute and the wire mesh.

The wire mesh 8a which is supported by the spacers 9a of doors 17 is separated from the wire mesh which is supported directly on the chute 10 at the point 17a.

Both the air passageways 7 and 11 are open at the top communicating with the space 12 beneath the roof 13 which is carried upon the exterior wall 6 of the container. The roof 13 is preferably made of metal and may be provided with a glazed skuttle in the roof as at 14. This roof is provided at its apex with a ventilator 15 and preferably with a motor-driven fan 16 for accelerating the passage of air out of the ventilator.

Returning to the chute 10, it will be noted that it is provided with a plurality of doors 17 through which hay may be withdrawn. On the interior of the chute 10 a plurality of steps 18 are provided to constitute a ladder for the operator. The bottom of the chute 10 communicates with a horizontal passageway 19 which extends beyond the wall 6 of the container as at 20 and thereby permits a covered communication with adjacent buildings. A door 21 is provided in this passageway 19 having a corrugated ceiling 19a for access to the interior of the hay containing space between the concentric wire mesh false walls of the container. Opposite the doors 17 are openings 17a in the wire mesh 8a. Sections of wire mesh are carried on the doors and removable therewith, thus permitting access through the openings in the wire mesh 8a when the doors 17 are opened. This construction is more fully shown in Figure 4 towards the right hand of the figure. The inner wire or foraminous wall surrounding the chute 10 is designated 8a.

One of the principles of determining the size and dimensions of this type of hay container is to have the distance A no greater than that which, in view of the size, kind and condition of the hay mounted therein, will easily permit of the circulation of air through the entire hay mass by reason of the entry of the air through the entrance vents as at 5 and 5a. Vents 5a are located in the outside wall 6 near the bottom thereof and allow the entrance of outside air into the space between the wall 6 and the wire mesh 8. The air flows through the mesh 8 into the hay located between the wire mesh walls 8 and 8a.

The air circulating through these passageways to and from the hay and through the wire mesh 8, 8a permits the carrying away of the gases which may be generated in the hay and maintains the hay at such a temperature that spontaneous combustion cannot take place.

It will be understood that any number of the passageways 4 may be provided for the purpose of furnishing adequate air circulation. Likewise, the openings 5 and 5a are adjusted in number for the purposes required.

To further facilitate this circulation of air and the evacuation of gases, I provide the fan 16. This fan is of advantage particularly in that it can be used to accelerate the evacuation of air during periods of the curing of the hay when it is generating the maximum amount of gases and the maximum amount of heat.

By providing a plurality of vertically-disposed metallic spacers for supporting the wire mesh, the maximum area of the mesh is left free for the circulation of air.

By the arrangement of the passageway 19 communicating with the chute 10 the hay can be removed from the container and delivered to adjacent buildings without being injured by weather.

By providing a series of doors 17, it is possible to have access to different levels of the hay so as to require the minimum amount of labor to pitch the hay from the container down the chute; by having the hay container of the minimum diameter, the distance of pitching the hay is reduced to the minimum. My invention, therefore, greatly economizes on manual labor in the operation of a farm, dairy and the like.

It will be understood that I desire to comprehend within my invention such modifications as may be necessary to adapt it to varying conditions and uses.

Having thus fully described my invention, what I claim as new and desire to secure by Letters Patent, is:

1. In a method of storing and ventilating hay, arranging the hay in a hollow column, introducing air at the bottom of the column and distributing it uniformly to the outside and inside thereof, circulating the air throughout the column, forcibly evacuating the air from the top of the column, removing hay from the top of the column from time to time, and delivering the removed hay downwardly centrally through the column and thence laterally outside of the column.

2. In combination, in a hay container, an outside continuous wall, a foundation support, said support having air inlet ports and air passageways extending to the center of the container, an interiorly-disposed continuous chute, means for forming a horizontally-disposed passageway connecting the bottom of said chute with the exterior of the container, a spaced false wall of wire mesh on the exterior of said chute forming an interior air chamber in communication with the passageways through the support, and a second false wall of wire mesh mounted in spaced relationship to the outside continuous wall on the interior of the outside continuous wall forming an air passageway.

3. In combination, in a hay container, an outside continuous wall, a foundation support, said support having air inlet ports and air passageways extending to the center of the container, an interiorly-disposed continuous chute, means for forming a horizontally-disposed passageway connecting the bottom of said chute with the exterior of the container, a spaced false wall of wire mesh on the exterior of said chute forming an interior air chamber in communication with the passageways through the support, a second false wall of wire mesh mounted in spaced relationship to the outside continuous wall on the interior of the outside continuous wall forming an air passageway, a roof supported by said container wall, and a ventilator mounted in said roof.

4. In combination, in a hay container, an outside continuous wall, a foundation support, said support having air inlet ports and air passageways extending to the center of the container, an interiorly-disposed continuous chute, means for forming a horizontally-disposed passageway connecting the bottom of said chute with the exterior of the container, a spaced false wall of wire mesh on the exterior of said chute forming an interior air chamber in communication with the passageways through the support, a second false wall of wire mesh mounted in spaced relationship to the outside continuous wall on the interior of the outside continuous wall forming an air passageway, a roof supported by said container wall, a ventilator mounted in said roof, and means for forcibly evacuating the air beneath said roof out of said ventilator.

5. In combination, in a hay container, an outside continuous wall, a foundation support, said support having air inlet ports and air passageways extending to the center of the container, an interiorly-disposed continuous chute, means for forming a horizontally-disposed passageway connecting the bottom of said chute with the exterior of the container, a spaced false wall of wire mesh on the exterior of said chute forming an interior air chamber in communication with the passageways through the support, a second false wall of wire mesh mounted in spaced relationship to the outside continuous wall on the interior of the outside continuous wall forming an air passageway, a roof supported by said container wall, a ventilator mounted in said roof, and means in said chute for removing hay comprising doors arranged at spaced intervals.

FREDERIC J. KREUTZER.